(12) United States Patent
Knudsen et al.

(10) Patent No.: US 11,632,668 B2
(45) Date of Patent: Apr. 18, 2023

(54) ADAPTIVE RELAY DISCOVERY

(71) Applicant: Nokia Technologies Oy, Espoo (FI)

(72) Inventors: Knud Knudsen, Aabybro (DK); Lars Holst Christensen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/726,074

(22) Filed: Apr. 21, 2022

(65) Prior Publication Data
US 2022/0345870 A1 Oct. 27, 2022

(30) Foreign Application Priority Data

Apr. 22, 2021 (FI) ..................................... 20215474

(51) Int. Cl.
| | | |
|---|---|---|
| *H04W 8/00* | (2009.01) | |
| *H04W 76/10* | (2018.01) | |
| *H04W 16/28* | (2009.01) | |
| *H04W 24/08* | (2009.01) | |
| *H04W 92/18* | (2009.01) | |

(52) U.S. Cl.
CPC ............ *H04W 8/005* (2013.01); *H04W 16/28* (2013.01); *H04W 24/08* (2013.01); *H04W 76/10* (2018.02); *H04W 92/18* (2013.01)

(58) Field of Classification Search
CPC ..... H04W 88/04; H04W 76/14; H04W 8/005; H04W 92/18; H04W 76/27; H04W 72/042; H04W 72/0406; H04W 72/02; H04W 40/22; H04W 72/14; H04W 4/40; H04W 76/11; H04W 48/12; H04W 48/10; H04W 72/04; H04W 24/02; H04W 48/16; H04W 76/10; H04W 48/18; H04W 4/46; H04W 76/19; H04W 40/12; H04W 36/36; H04W 24/04; H04W 40/246; H04W 76/18; H04W 16/28; H04W 24/08; H04B 7/15528
USPC .......................................................... 370/329
See application file for complete search history.

(56) References Cited

U.S. PATENT DOCUMENTS

| | | | | |
|---|---|---|---|---|
| 11,140,695 | B1 * | 10/2021 | Eyuboglu | .......... H04W 72/1257 |
| 2017/0353819 | A1 * | 12/2017 | Yin | .................... H04W 72/1284 |
| 2018/0092017 | A1 * | 3/2018 | Freda | ..................... H04W 36/36 |

(Continued)

FOREIGN PATENT DOCUMENTS

| | | | | |
|---|---|---|---|---|
| CN | 109479189 A | * | 3/2019 | ........ H04W 28/0284 |
| EP | 3618391 A1 | * | 3/2020 | ............ H04W 16/28 |

(Continued)

OTHER PUBLICATIONS

Report of email discussion [90#25][LTE/ProSe]Relay US initiation, discovery and selection/re-selection. 3GPP TSG-RAN WG2 Meeting #91, Beijing, China, Aug. 24-28, 2015, R2-153764 EPOQUENET NPL:XP051004410. Downloaded by EPO on Aug. 24, 2015. Sections 2.1.1, 2.2.2, 2.3.1.

*Primary Examiner* — Mahendra R Patel
(74) *Attorney, Agent, or Firm* — Lippes Mathias LLP

(57) ABSTRACT

A relay discovery may be performed by apparatuses acting as relay nodes sending first messages indicating existence of a relay capable node and user nodes monitoring the first messages. However, the relay nodes are configured to monitor broadcasted second messages, a second message being broadcasted by a user node that has determined it has a lack of sufficiency of link redundancy. The second message indicates a fast link discovery request for sidelink communications with service of quality requirements.

18 Claims, 5 Drawing Sheets

(56) References Cited

U.S. PATENT DOCUMENTS

| | | | | |
|---|---|---|---|---|
| 2018/0132304 A1* | 5/2018 | Lee | .................... | H04W 72/042 |
| 2019/0037461 A1* | 1/2019 | Li | ......................... | H04W 80/02 |
| 2019/0140908 A1* | 5/2019 | Ma | ....................... | H04W 48/16 |
| 2019/0379441 A1* | 12/2019 | Priyanto | ............. | H04W 72/042 |
| 2020/0092685 A1* | 3/2020 | Fehrenbach | ........... | H04W 36/18 |
| 2020/0322774 A1* | 10/2020 | Vargas | ................. | H04B 7/0695 |
| 2021/0099847 A1* | 4/2021 | Uchiyama | ............ | H04B 7/0695 |
| 2021/0168862 A1* | 6/2021 | Murray | ................. | H04W 76/32 |
| 2021/0195677 A1* | 6/2021 | Cheng | .................... | H04W 76/25 |
| 2021/0298066 A1* | 9/2021 | Damnjanovic | ....... | H04W 40/22 |
| 2021/0321267 A1* | 10/2021 | Kim | ...................... | H04B 7/0695 |
| 2022/0140967 A1* | 5/2022 | Khoryaev | ............ | H04W 80/02 |
| 2022/0191733 A1* | 6/2022 | Ali | ........................ | H04W 76/32 |

FOREIGN PATENT DOCUMENTS

| | | | | |
|---|---|---|---|---|
| EP | 3618391 A1 | 3/2020 | | |
| WO | WO-2018085568 A1 * | 5/2018 | ............. | H04L 47/30 |
| WO | WO 2018085568 A1 | 5/2018 | | |
| WO | WO-2019182341 A1 * | 9/2019 | ........ | H04W 28/0284 |
| WO | WO-2019201438 A1 * | 10/2019 | ........ | H04W 56/0015 |
| WO | WO-2020168285 A1 * | 8/2020 | .......... | H04W 72/042 |
| WO | WO-2021044382 A1 * | 3/2021 | ............ | H04W 76/19 |
| WO | WO 2021044382 A1 | 3/2021 | | |
| WO | WO-2021126785 A1 * | 6/2021 | ............ | H04W 76/19 |

* cited by examiner

ADAPTIVE RELAY DISCOVERY

The present application claims priority to Finland Application No. FI 20215474 filed Apr. 22, 2021.

TECHNICAL FIELD

Various example embodiments relate to wireless communications.

BACKGROUND

Wireless communication systems are under constant development. One way to increase network coverage or reliability or both is to use so called device-to-network relay technology in which sidelink communication is used, for example to receive data at a device from the network relayed via one or more other devices or transmit data from a device to another device, which then relays the data towards the network.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided an apparatus comprising at least one processor; and at least one memory including computer program code, the at least one memory and computer program code configured to, with the at least one processor, cause the apparatus at least to perform: determining sufficiency of link redundancy at least based on quality of service requirements; monitoring, at least when the link redundancy is sufficient, broadcasts of first messages, a first message indicating existence of a relay capable node for sidelink communications; and causing broadcasting, in response to lack of sufficiency of the link redundancy, to a plurality of directions, a second message indicating a fast link discovery request for sidelink communications, and monitoring responses to said second message.

In an embodiment, the at least one memory and computer program code are configured to, with the at least one processor, cause the apparatus further to at least to perform: monitoring responses to the second message a predetermined period; if no response is received during the predetermined period, repeating the causing broadcasting and the monitoring.

In embodiments, the at least one memory and computer program code are configured to, with the at least one processor, cause, in response to the lack of sufficiency of the link redundancy, the apparatus further to at least to perform: establishing a link to a relay node wherefrom a response to the second message has been received, the establishing comprising: determining beam alignment for the link based on a best reception antenna of the response and based on information in the response, the information indicating best transmission antenna to the relay node; and using in the link establishment resources indicated in the response.

In embodiments, the at least one memory and computer program code are configured to, with the at least one processor, cause, in response to lack of sufficiency of the link redundancy, the apparatus further to at least to perform: selecting, before causing broadcasting, antennas via which the second message is to be broadcasted; and using the antennas selected in broadcasting the second message.

In embodiments, the at least one memory and computer program code are configured to, with the at least one processor, cause, in response to the lack of sufficiency of the link redundancy, the apparatus further to at least to perform said selecting by selecting a sub-set of the antennas based on a direction the apparatus is moving and/or based on a number of slots one or more relay capable nodes are monitoring second messages.

In embodiments, the at least one memory and computer program code are configured to, with the at least one processor, cause, in response to the lack of sufficiency of the link redundancy, the apparatus further to at least to perform: determining, before causing broadcasting, a transmission power for the broadcasting of the second message.

In embodiments, the at least one memory and computer program code configured to, with the at least one processor, cause, in response to the lack of sufficiency of the link redundancy, the apparatus further to at least to perform: determining, before causing broadcasting, whether any transmission gaps are needed to broadcast the second message; and informing, in response to one or more transmission gaps being needed, before causing broadcasting, corresponding one or more relay nodes on the need for one or more transmission gaps.

According to an aspect there is provided an apparatus comprising at least one processor; and at least one memory including computer program code, the at least one memory and computer program code configured to, with the at least one processor, cause the apparatus at least to perform: monitoring broadcasted second messages over a plurality of directions, wherein a second message indicates a fast link discovery request for sidelink communications with service of quality requirements; determining, when detecting a second message, whether there are resources available for relaying the sidelink communications with the service of quality requirements; and causing sending, in response to resources being available, a response to the second message using a direction determined to be the best when receiving the second message.

In an embodiment, the at least one memory and computer program code are configured to, with the at least one processor, cause, the apparatus to perform during the determining at least: determining, in response there is not enough resources available, whether there are one or more sidelinks that have a lower priority than the one indicated by the service of quality requirements in the second message and that have resources, if taken into use, combined with available resources, will result to enough resources to meet the service of quality requirements; and taking, if the service of quality requirements are met, before sending the response, the resources allocated to said one or more sidelinks that have the lower priority, into use for the sidelink communications requested in the second message.

In embodiments, the at least one memory and computer program code are configured to, with the at least one processor, cause the apparatus, when the second message comprises a sequence and an encoded message, further to at least to perform: detecting the sequence; determining a beam direction over which a symbol with the strongest value in the sequence was received to be the best direction; decoding, in response to detecting the sequence, the encoded message; and adding, in response to resources being available, as information indicating the best transmission antenna to the apparatus, information on the symbol to the response before causing sending the response.

In embodiments, the at least one memory and computer program code are configured to, with the at least one processor, cause, in response to lack of sufficiency of the link redundancy, the apparatus further to at least to perform determining, in response to resources being available, before causing sending the response, a transmission power for the response based at least on the transmission power used for the second message and/or reception power of the second message and/or reception quality of the second message.

In embodiments, the at least one memory and computer program code are configured to, with the at least one processor, cause the apparatus to perform said monitoring as a quasi-omnidirectional reception.

According to an aspect there is provided an apparatus comprising means for performing: determining sufficiency of link redundancy at least based on quality of service requirements; monitoring, at least when the link redundancy is sufficient, broadcasts of first messages, a first message indicating existence of a relay capable node for sidelink communications; and causing broadcasting, in response to lack of sufficiency of the link redundancy, to a plurality of directions, a second message indicating a fast link discovery request for sidelink communications, and monitoring responses to said second message.

According to an aspect there is provided an apparatus comprising means for performing: monitoring broadcasted second messages over a plurality of directions, wherein a second message indicates a fast link discovery request for sidelink communications with service of quality requirements; determining, when detecting a second message, whether there are resources available for relaying the sidelink communications with the service of quality requirements; and causing sending, in response to resources being available, a response to the second message using a direction determined to be the best when receiving the second message.

According to an aspect there is provided a method comprising: determining, by an apparatus, sufficiency of link redundancy at least based on quality of service requirements; monitoring, by the apparatus, at least when the link redundancy is sufficient, broadcasts of first messages, a first message indicating existence of a relay capable node for sidelink communications; and causing broadcasting, from the apparatus, in response to lack of sufficiency of the link redundancy, to a plurality of directions, a second message indicating a fast link discovery request for sidelink communications, and monitoring, by the apparatus, responses to said second message.

According to an aspect there is provided a method comprising: monitoring, by an apparatus, broadcasted second messages over a plurality of directions, wherein a second message indicates a fast link discovery request for sidelink communications with service of quality requirements; determining, by the apparatus, when detecting a second message, whether there are resources available for relaying the sidelink communications with the service of quality requirements; and causing sending from the apparatus, in response to resources being available, a response to the second message using a direction determined to be the best when receiving the second message.

According to an aspect there is provided a computer-readable medium comprising program instructions, which, when run by an apparatus, cause the apparatus to carry out at least one of a first process or a second process, wherein the first process comprises at least: determining sufficiency of link redundancy at least based on quality of service requirements; monitoring, at least when the link redundancy is sufficient, broadcasts of first messages, a first message indicating existence of a relay capable node for sidelink communications; and causing broadcasting, in response to lack of sufficiency of the link redundancy, to a plurality of directions, a second message indicating a fast link discovery request for sidelink communications, and monitoring responses to said second message; wherein the second process comprises at least: monitoring broadcasted second messages over a plurality of directions; determining, when detecting a second message, whether there are resources available for relaying the sidelink communications with the service of quality requirements; and causing sending, in response to resources being available, a response to the second message using a direction determined to be the best when receiving the second message.

In an embodiment, the computer readable medium is a non-transitory computer readable medium.

According to an aspect there is provided a computer-readable medium comprising program instructions, which, when run by an apparatus, cause the apparatus to carry out at least: determining sufficiency of link redundancy at least based on quality of service requirements; monitoring, at least when the link redundancy is sufficient, broadcasts of first messages, a first message indicating existence of a relay capable node for sidelink communications; and causing broadcasting, in response to lack of sufficiency of the link redundancy, to a plurality of directions, a second message indicating a fast link discovery request for sidelink communications, and monitoring responses to said second message.

According to an aspect there is provided a computer-readable medium comprising program instructions, which, when run by an apparatus, cause the apparatus to carry out at least: monitoring broadcasted second messages over a plurality of directions, a second message indicating a fast link discovery request for sidelink communications; determining, when detecting a second message, whether there are resources available for relaying the sidelink communications with the service of quality requirements; and causing sending, in response to resources being available, a response to the second message using a direction determined to be the best when receiving the second message.

According to an aspect there is provided a non-transitory computer-readable medium comprising program instructions, which, when run by an apparatus, cause the apparatus to carry out at least: determining sufficiency of link redundancy at least based on quality of service requirements; monitoring, at least when the link redundancy is sufficient, broadcasts of first messages, a first message indicating existence of a relay capable node for sidelink communications; and causing broadcasting, in response to lack of sufficiency of the link redundancy, to a plurality of directions, a second message indicating a fast link discovery request for sidelink communications, and monitoring responses to said second message.

According to an aspect there is provided a non-transitory computer-readable medium comprising program instructions, which, when run by an apparatus, cause the apparatus to carry out at least: monitoring broadcasted second messages over a plurality of directions, a second message indicating a fast link discovery request for sidelink communications; determining, when detecting a second message, whether there are resources available for relaying the sidelink communications with the service of quality requirements; and causing sending, in response to resources being available, a response to the second message using a direction determined to be the best when receiving the second message.

According to an aspect there is provided a computer program comprising instructions which, when the program is executed by an apparatus, cause the apparatus to carry out at least one of a first process or a second process, wherein the first process comprises at least: determining sufficiency of link redundancy at least based on quality of service requirements; monitoring, at least when the link redundancy is sufficient, broadcasts of first messages, a first message indicating existence of a relay capable node for sidelink communications; and causing broadcasting, in response to lack of sufficiency of the link redundancy, to a plurality of directions, a second message indicating a fast link discovery request for sidelink communications, and monitoring responses to said second message; wherein the second process comprises at least: monitoring broadcasted second messages over a plurality of directions; determining, when detecting a second message, whether there are resources available for relaying the sidelink communications with the service of quality requirements; and causing sending, in response to resources being available, a response to the second message using a direction determined to be the best when receiving the second message.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultrawideband (UWB) technology, sensor networks, mobile ad-hoc networks (MANETs) and Internet Protocol multimedia subsystems (IMS) or any combination thereof.

Figure 1:
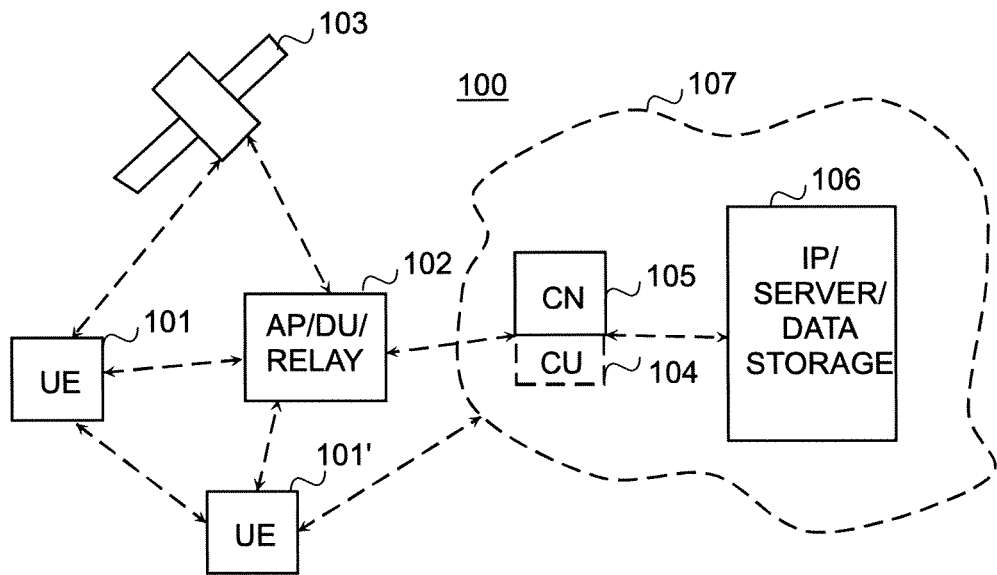
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links maybe used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus.

The user device typically refers to a portable computing device that includes wireless mobile communication devices operating with a subscription entity, for example a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, wearable device, and multimedia device. It should be appreciated that a user device may also be a nearly exclusive uplink only device, of which an example is a camera or video camera loading images or video clips to a network. A user device may also be a device having capability to operate in Internet of Things (loT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilize services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (loT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more integrated access and backhaul (IAB) nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

One way to extend network coverage and/or reliability, for example 4G, 5G and beyond 5G, is to use for multi-connectivity a concept called a sidelink, in which data is relayed via one or more devices between a wireless network and a user device. The concept may be called "user equipment to network relaying" (UE-to-NW relaying, device-to-network relaying), or indirect communication. The concept may be used, for example, in smart industry, public safety services and vehicle-to-everything (V2X) services. The vehicle-to-everything services includes vehicle-to-vehicle (V2V), vehicle-to-pedestrian (V2P), and vehicle-to-infrastructure (V2I), for example. In the smart industry different Industrial Internet of Things (IIoT) devices, such as sensors, control loops and/or monitoring devices, for example in automated guided vehicles or mobile robots, may use cyber-physical control applications to control and coordinate movements. Communication services supporting cyber-physical control applications need to be ultra-reliable, dependable with a high communication service availability, and may require low or, in some cases, very low end-to-end latency.

Figure 2:
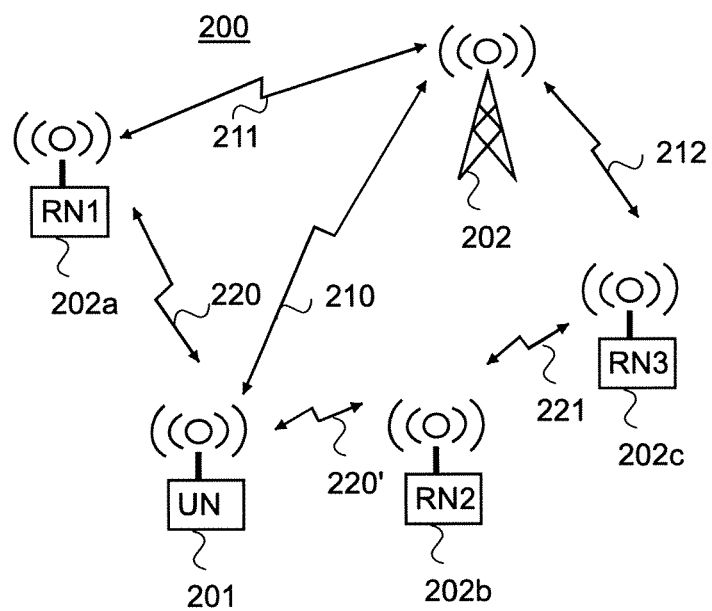
FIG. 2 illustrates an exemplified sidelink usage situation.

FIG. 2 provides a highly simplified example of a sidelink based multilink connectivity concept in view of a sidelink user node. The sidelink user node represents herein a device (a user device) that is either a data source or a data destination, i.e. provides end-to-end communication, and terms user node (UN) and user device are used as synonyms herein. Further, term relay node (RN) is used herein for a device capable of relaying communication to/from the user device. In other words, a relay node may relay traffic to/from an access node or to/from another relay node. It should be appreciated that one device can be both the user node and the relay node.

Referring to FIG. 2, the system 200 may be a private network or a public network or any combination thereof. The system 200 may a plurality of devices, that are configured to support multi-connectivity, to communicate with each other using sidelink communication (direct communication, machine type communications), and at least some of them are configured to support relay functionality and are capable to have a wireless connection to a wireless network. In the illustrated example, at the captured moment, the user node (UN) 201 has sidelink connections 220, 220' to two remote nodes RN1 202*a*, RN2 202*b*, and a wireless connection 210 to an access node 202. The wireless network is provided by means of access nodes (gNBs, base stations) via corresponding cells, as described above with FIG. 1. However, it should be appreciated that the user node 201 may use mere sidelink connections, i.e., no direct link 210 to the access node 202 is required. In 5G, the interface for the sidelink 220, 220' is called PC5 and the interface 210 for the wireless connection to the serving wireless network (in the illustrated example to a base station) is called Uu interface.

The user node 201 and/or one or more of the relay nodes RN1 202*a*, RN2 202*b*, RN3 202*c* and/or an obstacle blocking sidelink communications may be moving. The result may be that the sidelink 220 to relay node RN1 202*a* is lost, and a sidelink to relay node RN3 202*c* may be needed. For that purpose, the user node 201 is configured to perform a relay discovery, and different example functionalities relating to the relay discovery are disclosed with FIGS. 3 to 9. The relay discovery is a process that determines that two sidelink enabled devices (apparatuses), at least one of which is relay capable, are within radio range of each other. A device is relay capable, i.e. is a relay node, when it is configured to support relaying via a sidelink, and the device has at least one active link to the network, either a direct link to an access node, as illustrated with links 211 and 212, i.e., a link 211 between the relay node RN1 202*a* and the access node 202 and a link 212 between the relay node RN3 202*c* and the access node 202, or via another relay node, as illustrated by a link 221 between the relay node RN2 202*b* and the relay node RN3 202*c*, and that relaying is enabled.

In below examples of FIGS. 3 to 9, the relay discovery is an active relay discovery between a user node and one or more relay nodes. In the active relay discovery the user node is attached to the wireless network and is synchronized with the wireless network and performs the relay discovery to support a relay reselection and/or link establishment and/or handover and/or multi-connectivity. Further, for the clarity of description, in the examples of FIGS. 3 to 6, when the user node has a lack of sufficiency, first messages are not monitored. However, it should be appreciated that monitoring the first messages may continue as a background process. The relay node may also, while performing functionality described with FIGS. 7 to 9, perform transmitting first messages periodically (and monitoring responses received).

Figure 3:
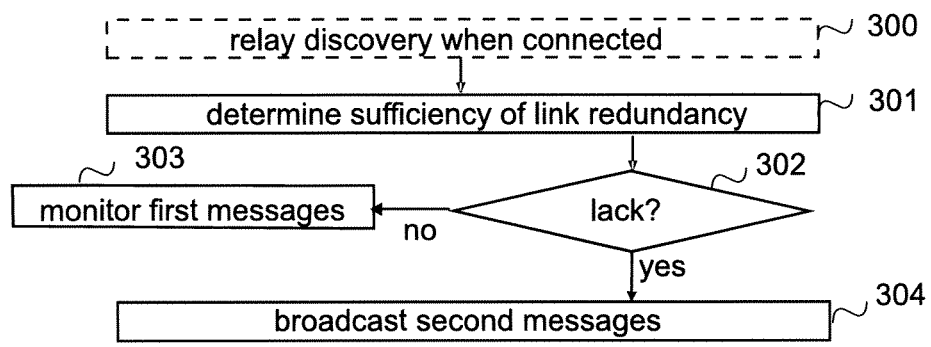
FIGS. 3 to 8 are flow charts illustrating different examples of functionalities.

Referring to FIG. 3, when the user node (an apparatus acting as the user node) is in the active relay discovery state, i.e. performing relay discovery when connected to the wireless network (block 300), the user node determines in block 301 sufficiency of link redundancy, based on quality of service requirements, for example reliability and latency, and the number of simultaneous links the user node is configured to support, to achieve required reliability.

If the link redundancy is sufficient (block 302: no), the user node monitors (listens) in block 303 first messages sent by relay nodes. The first messages are discovery messages. The monitoring may be performed periodically, for example as pre-configured by the wireless network. By pre-configuring the user node is made aware which resources to monitor, i.e. to use to receive broadcasted first messages. In an alternative implementation the user node is configured to monitor in every slot (and predefined resources are used to transmit the first messages). This monitoring first messages and any related functionality may be called a normal mode.

If there is a lack of link redundancy (block 302: yes), the user node broadcast in block 304 second messages, for example a second message per a direction (beam), in parallel or simultaneously. A second message may be a combination of a sequence or preamble and an encoded message). The sequence (preamble) serves as a simple signal which is easy to detect. Further, the sequence may be used for timing synchronization. The encoded message part is decodable in case the sequence has been detected, and it contains additional detailed information. The additional detailed information may comprise identifier of the user node, and/or transmission power information, and/or quality of service requirements and/or existing sidelink identifier(s) and/or relay node identifier(s). A second message may be called a fast discovery request, and correspondingly this broadcasting and any related functionality may be called a fast discovery procedure mode.

Since the second message is broadcasted, it is transmitted using common resources, reserved across a network, or a subnetwork, or environment, for example inside a factory. In other words, no cell-specific resources are used. The common, dedicated resources may be resources allocated as a part of an ultra-reliable low-latency communication dedicated bandwidth path, for example. The use of dedicated reserved resources for broadcast of second messages means that transmission of the second message does not depend, for example, on configured grant, semi persistent scheduling or channel busy ration.

Link redundancy may be deemed to be sufficient, when the user node is capable to maintain the required quality of service, for example required reliability and latency, even if one of the links currently in use is blocked, or in case there is one link in use and the required quality of service does not require link redundancy. The user node capability also affects: if the user node is configured to support a single link, then it will have always a lack of link redundancy for services requiring link redundancy to meet the required quality. If the user node is configured (capable) to support two simultaneous links and both links on its own meets the required quality of service, the link redundancy is deemed to be sufficient. If the user node is configured to support three or more simultaneous links, the user node may be configured to determine that the link redundancy is sufficient if the required quality of service is met even in case the best of existing links is blocked.

Quality of individual links may be also taken into account when the sufficiency of the link redundancy is determined. For example, the user node may be configured to replace a link in response to a transmission power exceeding a pre-set or preconfigured power threshold and /or a throughput dropping below a pre-set or pre-configured threshold, and/or a sidelink reference signal received power dropping below a pre-set or pre-configured threshold, and/or a sidelink reference signal received quality dropping below a pre-set or pre-configured threshold, and/or channel quality, for example channel quality indicator, dropping below a pre-set or pre-configured threshold and/or no downlink data being received within a period and/or no acknowledgements being received on uplink data.

Figure 4:
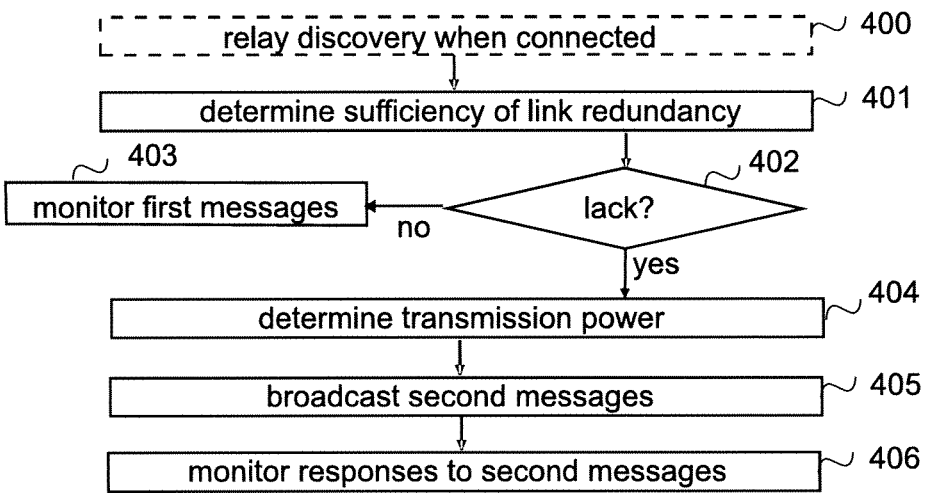

Referring to FIG. 4, when the user node (an apparatus acting as the user node) is in the active relay discovery state, i.e., performing relay discovery when connected to the wireless network (block 400), the user node determines in block 401 sufficiency of link redundancy, based on quality of service requirements, as described with block 301.

If the link redundancy is sufficient (block 402: no), the user node monitors (listens) in block 403 first messages sent by relay nodes, as described above with block 303.

If there is a lack of link redundancy (block 402: yes), in the example illustrated in FIG. 4, the user node determines in block 404 transmission power for the second messages. The transmission power may be determined based on the urgency of discovering alternative relay nodes. For example, the more urgent it is to the user node to discover alternative relays, the higher the transmission power may be. Any rule to determine urgency may be used. For example, urgency may be determined based on a relative drop in quality of service for existing links, and/or among of buffered undelivered data exceeding a preset threshold, and/or based on a speed the user node is moving, just to list some examples. The smaller the transmission power is, the closer the relays hearing the broadcasted second messages are (thereby the number of received responses remains smaller). Further, the smaller the transmission power is, the smaller is interference caused by the broadcasting of the second messages. Then, using the determined transmission power, the user node broadcast in block 405 second messages, for example a second message per a direction (beam), in parallel or simultaneously, as described above with FIG. 3 (block 405 corresponds to block 304). After broadcasting the second messages, the user node monitors in block 406, whether any responses to the second messages are received. The monitoring may be performed as a quasi-omnidirectional reception in which the user node monitors all of its beams in a beam per beam manner. The process ends if no responses are received. If one or more responses are received, a link will be established, for example as will be described with FIG. 6.

Figure 5:
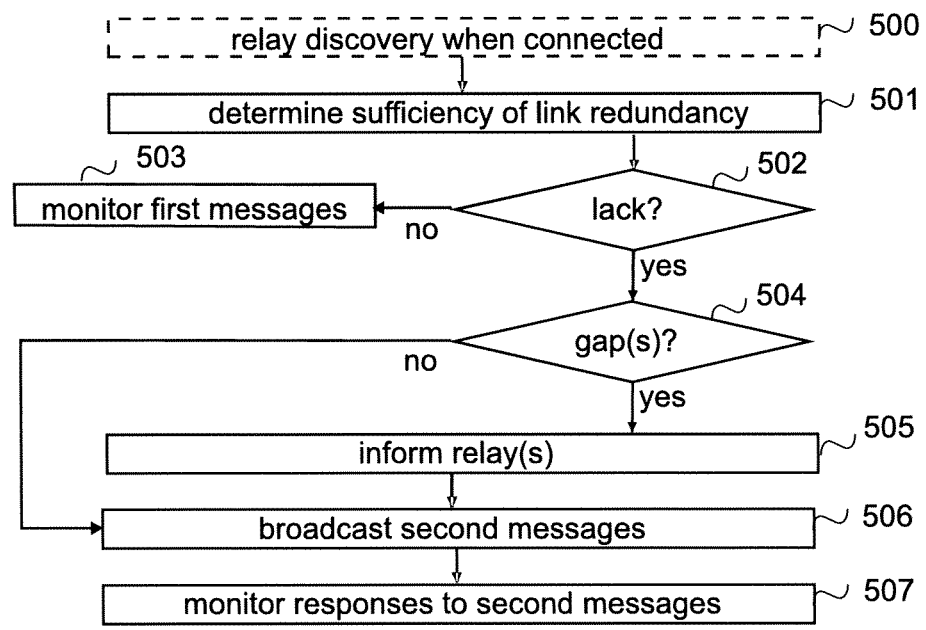

Referring to FIG. 5, when the user node (an apparatus acting as the user node) is in the active relay discovery state, i.e., performing relay discovery when connected to the wireless network (block 500), the user node determines in block 501 sufficiency of link redundancy, based on quality of service requirements, as described with block 301.

If the link redundancy is sufficient (block 502: no), the user node monitors (listens) in block 503 first messages sent by relay nodes, as described above with block 303.

If there is a lack of link redundancy (block 502: yes), in the example illustrated in FIG. 5, the user node determines in block 504 whether it needs to make one or more transmission gaps to broadcast the second messages. The need for the one or more transmission gaps may depend on the user nodes capability to perform simultaneous transmissions in different directions, and/or whether the link(s) are scheduled for uplink user data traffic. During a gap no other data is transmitted by the user node than the second message(s). If one or more gaps are needed (block 504: yes), corresponding one or more relay nodes are informed in block 505. In other words, causing sending information on a gap is performed in block 505. After informing (block 505), or if no gap is needed (block 504: no), the user node broadcast in block 506 second messages, for example a second message per a direction (beam), in parallel or simultaneously, as described above with FIG. 3 (block 506 corresponds to block 304). After broadcast the second messages, the user node monitors in block 507, whether any responses to the second messages is received, for example in a similar way as described above with block 406. The process ends if no responses are received. If one or more responses are received, a link will be established, for example as will be described with FIG. 6.

Figure 6:
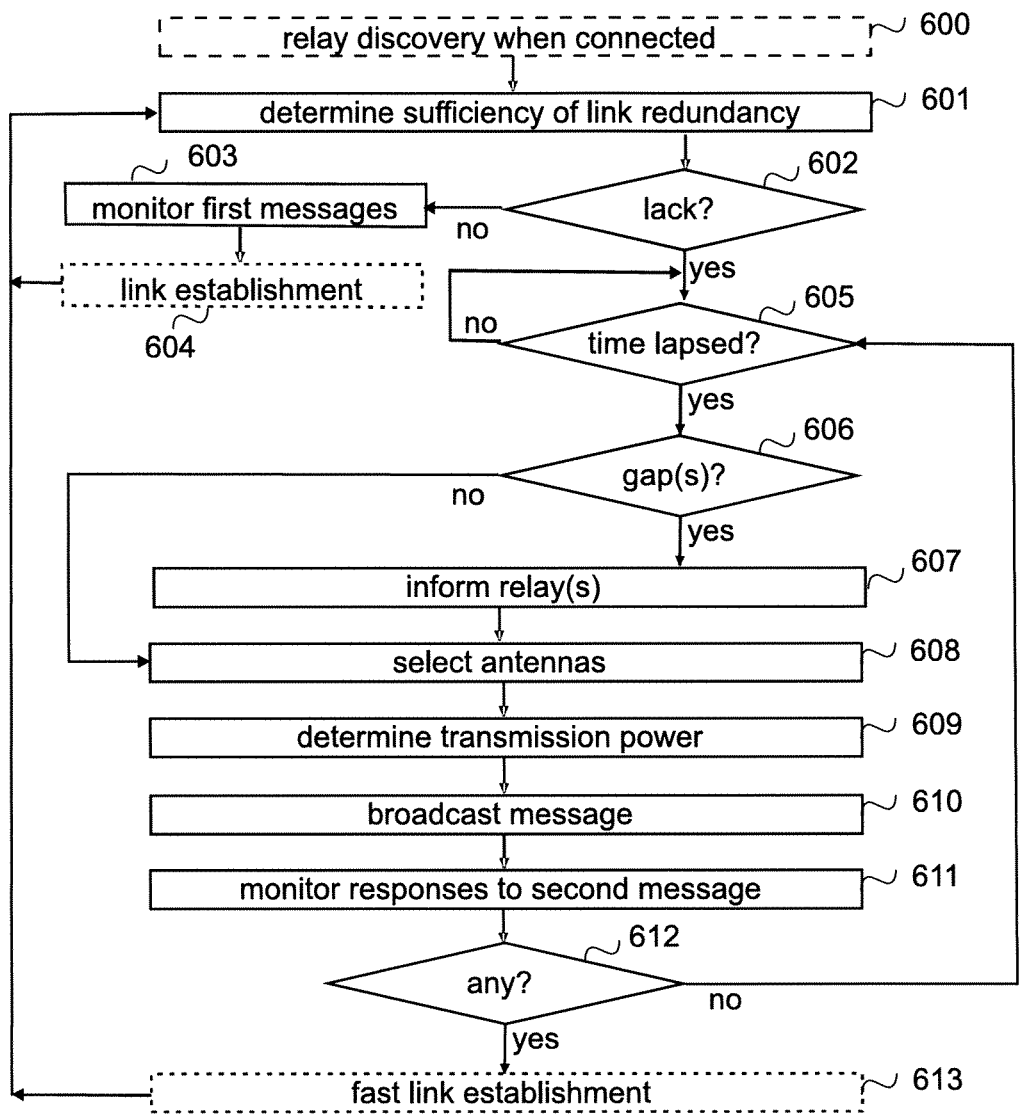

Referring to FIG. 6, when the user node (an apparatus acting as the user node) is in the active relay discovery state, i.e., performing relay discovery when connected to the wireless network (block 600), the user node determines in block 601 sufficiency of link redundancy, based on quality of service requirements, as described with block 301.

If the link redundancy is sufficient (block 602: no), the user node monitors (listens) in block 603 first messages sent by relay nodes, as described above with block 303, and based on received first messages may perform in block 604 link establishment procedure, which starts by beam alignment signaling, and then returns to block 601 to determine the sufficiency of link redundancy. Since no changes are required to the link establishment procedure, there is no need to describe it more detail herein.

If there is a lack of link redundancy (block 602: yes), in the example illustrated in FIG. 6, the user node determines in block 605 whether a predetermined minimum time from previous broadcast of second messages has lapsed. In other words, the user node is configured to broadcast second messages using a preset or preconfigured minimum periodicity between broadcasts. By specifying the minimum periodicity broadcasting too often is avoided to minimise possible interference caused by the second messages to other devices. When the time has lapsed (block 605: yes), the user node determines in block 606 whether it needs to make one or more transmission gaps to broadcast the second messages, as described above with block 404. If one or more gaps are needed (block 606: yes), corresponding one or more relay nodes are informed in block 607. After informing (block 607), or in parallel, or if no gap is needed (block 606: no), the user node selects in block 608 antennas which are swept through during the broadcast. The user node may select all its antennas, or may be configured to alternatively select a subset of antennas, said subset representing the most interesting directions, which could for instance be correlated with the direction in which the user node is moving and/or based on earlier obtained network information on where fixed relays locate, if any fixed relays exits. Further, in case the number of antennas in the user node exceeds the number of slots one or more of relay nodes are listening, the user node may select a subset of antennas, the number of antennas in the subset being equal to or smaller than said number of slots. The user node may have, as preconfigured data, the number of slots the one or more of relay nodes are listening, or the network may broadcast said information. Since the second message does not require a high signal to noise ratio, a relay node most probably can detect and decode, i.e., receive, the second message even when it is not transmitted on the most best antenna. Hence, selecting a subset of antennas in block 608 does not slow down the fast discovery process in the fast discovery mode. Also, the transmission power of the second messages is determined in block 609, as described above with block 404 in FIG. 4. Then the user node broadcast in block 610 second messages, for example a second message per a direction (beam), in parallel or simultaneously, as described above with block 304 in FIG. 3, sweeping through the selected antennas. After broadcast the second messages, the user node monitors in block 611 whether any responses to the second messages is received, for example in a similar way as described above with block 406. If no response is received (block 612: no), and the minimum periodicity has lapsed (block 605: yes), the process returns to determine whether gaps are needed.

If one or more responses are received (block 612: yes), a link will be established in block 613 in a fast manner. In other words, a fast link establishment is performed in block 613 and then the process returns to block 601 to determine the sufficiency of link redundancy.

In the fast link establishment, if responses are received from two or more relay nodes, the user node selects one relay node with which to establish a link. Any selection criteria may be used. When receiving a response, the user node detects the antenna via which the strongest response from a relay node is received. The user node is configured to use said antenna as the best reception antenna (beam direction) for the initial beam alignment in the user node. Further, the response from a relay node indicates a best transmission antenna to the relay node. In other words, the response contains information on a symbol in which the relay node received the strongest sequence (preamble) of the second message, and the user node may be configured to determine that the antenna used when said symbol was transmitted from the user node is the best antenna (beam direction) in the relay node point of view. The beam alignment may be performed using the information on the best antennas. In other words, the beam alignment is performed in parallel with the discovery procedure, without any additional signaling or need to wait for information from the access node, for example synchronization signal block, or corresponding information that would be used in a direct link between a user node and the access node for beam alignment. In case the response assigns resources, the link establishment can move directly to the assigned resources without invoking a physical random access channel procedure, for example. Further, transmission power to be used by the user node over the established link, may be determined using pathloss estimation. In other words, the transmission power to be used may be calculated based on received signal strength of the response.

As can be seen from the above example, when the user node is in the active relay discovery state, the user node is either on a normal mode (blocks 603 and 604) or in the fast discovery mode (blocks 605 to 615), depending on the service requirements, for example.

Figure 7:
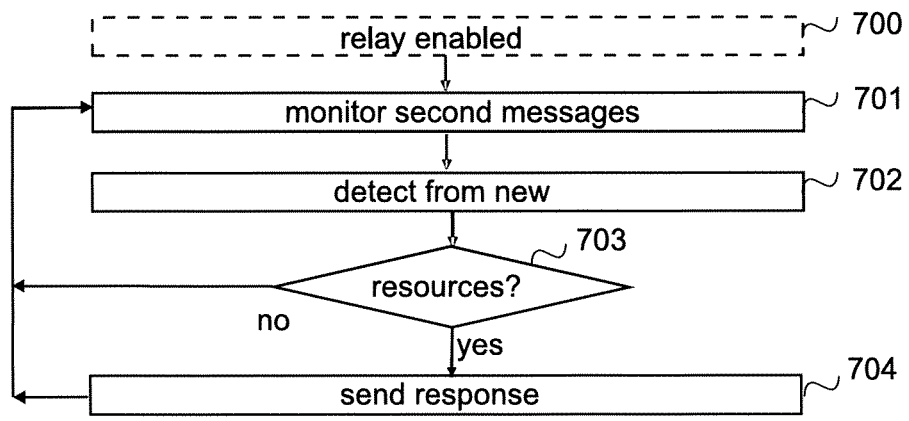
Figure 8:
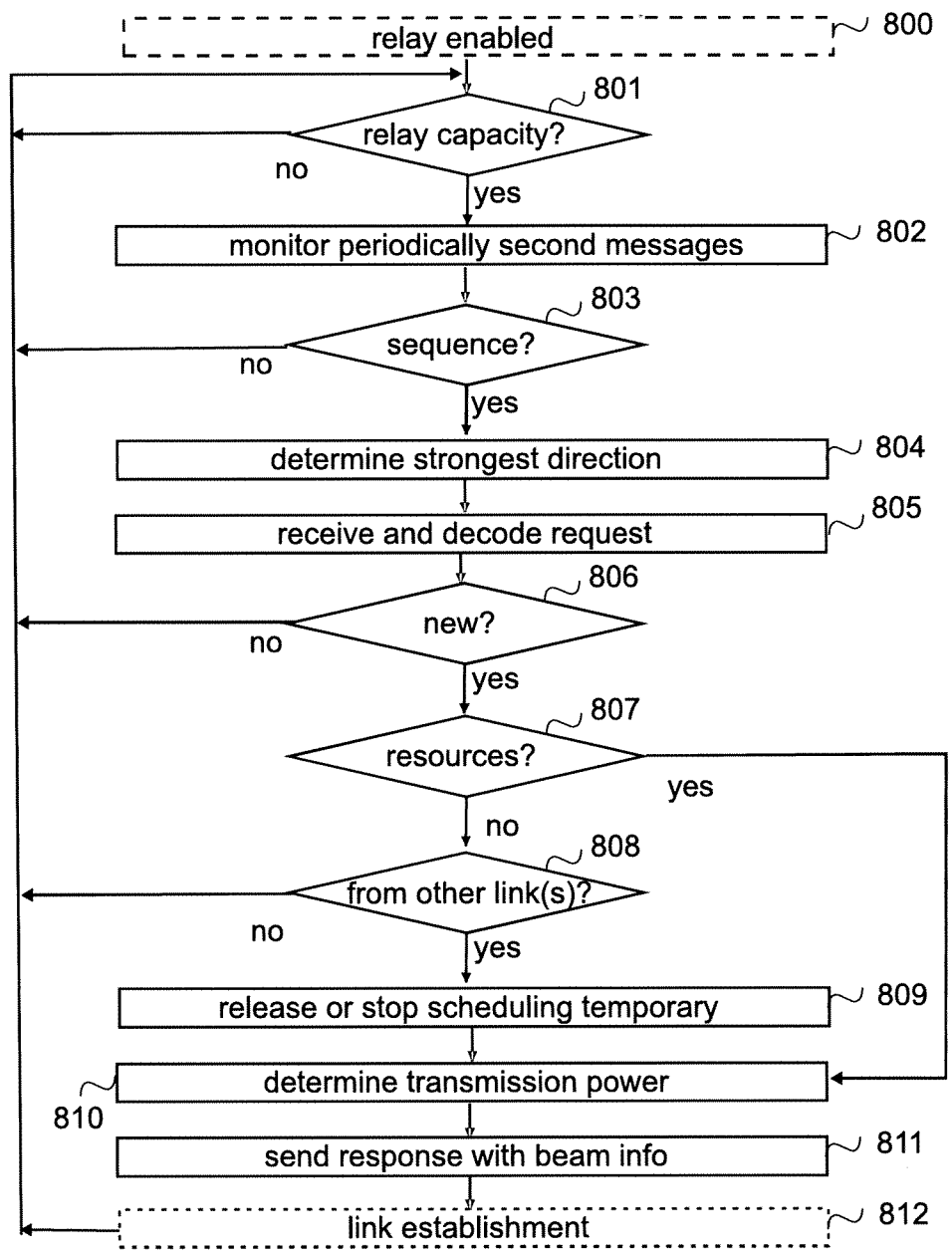

FIGS. 7 and 8 illustrates different functionalities of an apparatus that is acting a relay node (the apparatus may in parallel) for the fast relay discovery mode. It should be appreciated that the apparatus may in parallel broadcast first messages and/or act as the user node but, for the sake of clarity of the description, such functionality is not described herein.

Referring to FIG. 7, when the relay node (an apparatus acting as the relay node) is in a relay enabled mode (block 700), i.e. is configured to support the fast discovery mode, is relay capable and is performing relaying or ready to perform relaying, the relay node monitors (listens) in block 701 broadcasted second messages. The monitoring may be performed by the relay node monitoring periodically, i.e. at certain time intervals, a preconfigured time, shorter than the length of the time interval, resources dedicated for second messages. It should be appreciated that the actual amount of resources allocated for the fast discovery process is up to network configuration, since resources are allocated also for other signaling and data traffic. The monitoring may be performed as a quasi-omnidirectional reception in which the relay nodes monitors all of its beams in a beam per beam manner. Monitoring all directions may be performed in parallel or time multiplexed. If the relay node is configured to support parallel reception, then the relay node is configured to process the received second message via different antennas as individual second messages in order to determine which direction (beam) received the strongest second message, or the strongest sequence (preamble) of the second message. The strongest direction (beam) is the best direction (beam) for the link in view of the relay node.

When a second message from a new user node, i.e. from a user node with which the relay node does not have a link (sidelink) is detected in block 702 the relay node determines, based on the quality of service requirements information in the second message, whether it has resources to provide (offer) the requested quality of service. If not (block 703: no), the relay nodes returns to block 701 to monitor second messages.

If there are enough resources (block 703: yes), the relay node sends in block 704 a response to the second message and then returns to block 701 to monitor second messages. Resources for the link may also be temporarily allocated in block 703. The response comprises at least information on the best direction (beam), for example information on a symbol in which the relay node received the strongest sequence (preamble) of the second message. In other words, the response indicates a best transmission antenna to the relay node. Further, the response may comprise information on the allocated resources. The response may be called a fast discovery response.

Referring to FIG. 8, when the relay node (an apparatus acting as the relay node) is in a relay enabled mode (block 800), i.e., is configured to support the fast discovery mode, is relay capable and is performing relaying or ready to perform relaying, the relay node is configured to determine in block 801, whether it has available capacity for relaying, or for additional relaying. The capacity may depend on resources available, the number of relay links the relay node is configured to support and how many are in use, processing capacity of the relay node, bandwidth in use, etc. When the relay node determines that there is relay capacity available (block 801: yes), the relay node monitors (listens) in block 802 periodically broadcasted second messages in all directions. The periodicity may be preset or preconfigured to be equal to one or more slot duration. The monitoring in all directions may be performed as described above with block 701 in FIG. 7. If no sequences (preambles) of second messages is detected (block 803: no) during the periodic monitoring, the process returns to block 801 to determine available relay capacity.

If a sequence is detected (block 803: yes), the relay node determines in block 804 the strongest direction wherefrom the sequence was received. In other words, the relay node detects a symbol with the strongest value as well as the beam direction the symbol was received. Further, depending on the implementation, the relay node may use the sequence to obtain fine timing synchronization with the user node.

After detecting and receiving the sequence, the relay node receives and decodes in block 805 the discovery request in the second message. Then the relay node checks in block 806, whether the user node identifier in the request is one of the user node identifiers the relay node already has a link. In other words, it is determined in block 806, whether the user identifier is from a new user node. If not (block 806), there is already an existing link between the relay node and the user node, and the procedure returns to block 801 to determine availability of relay capacity.

If it is determined that the second message is received from a new user node (block 806), it is checked in block 807, whether the available capacity provides enough available resources to fulfill the quality of service needed for a link, as indicated in the decoded message. If it is determined that there is not enough resources available (block 807: no), the relay node is configured, in the illustrated example, to determine whether there are one or more other links to/from the relay node that have a lower priority, based on the quality of service information, whose release or temporary non-use would provide enough additional resources to relay capacity determined in block 801 so that the quality of service requirement indicated in the second message may be met. In other words, it is determined, whether there are allocated resources that can be taken into use. If there are no such resources, or not enough such resources (block 808: no), the procedure returns to block 801 to determine availability of relay capacity. If capacity (resources) may be taken into use, i.e. stolen or loaned from a lower priority link (block 808: yes), the relay node either releases in block 809 corresponding one or more links, or temporarily stops in block 809 scheduling data transmissions on one or more of the links. After block 809, or if in block 807 it is determined that there are enough resources (block 807: yes), the relay node determines in block 810 a transmission power to be used for a response to the fast link discovery request in the second message. The relay node may be configured to determine the transmission power by using information on the transmission power used by the user node, the information being included in the second message, and/or using measured reception power, for example sidelink reference signal received power and/or reception quality of the second message. For example, the relay node may be configured to use the same, or almost the same, transmission power as the user node used, unless the second message was received by the relay node with a high sidelink reference signal received power and/or with a high sidelink reference signal received quality. In the latter case the relay node may be configured to use a smaller transmission power than the user node used to avoid unnecessary interference. (A sidelink reference signal received power is high if it exceeds a preset threshold or is deemed to be high based on a pathloss estimation. The same applies to the sidelink reference signal received quality.) After that the relay node has allocated (for example, as part of the procedure in block 807) the resources needed for the link, has determined the best beam (direction) and the transmission power. The relay node sends in block 811 to the user node a response to the fast link discovery request in the second message. The response is sent using the direction (beam) determined in block 804. The response contains at least information on the symbol with the strongest value. The response may further contain the user node identifier for contention resolution, the transmission power used, the allocated resources and/or the relay node identifier.

Then, depending on how many responses the user node received and which relay node the user node selected, a link may be established in block 812 in a fast manner, described above with FIG. 6. Regardless of whether the link is established or not, the process returns to block 801 to determine availability of relay capacity. It should be appreciated that if a link is not established within a preconfigured time period, the relay node assumes that the user node has selected another relay node, and temporarily allocated resources are released.

In another implementation block 801 is not performed, i.e. the relay node is configured to monitor (listen) second messages regardless on available relay capacity. In the implementation, the relay node may drop one or more existing links to always serve a user node with a more critical service requirement (more critical communication link).

Figure 9:
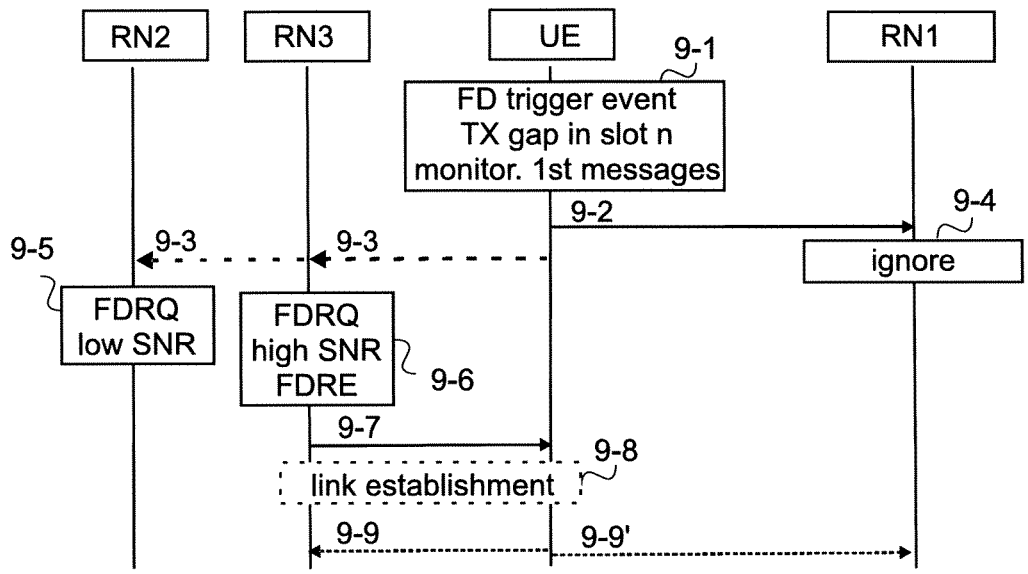
FIG. 9 to illustrates an example of information exchange.

FIG. 9 illustrates an example of information exchange in a situation when, when a user node, denoted by UE in FIG. 9 has a sidelink to a relay node RN1, and there are other relay nodes RN2, RN3, near to the user node. In the illustrated example, the relay nodes are configured to, in order to avoid conflicting response messages, to respond only if the second message was received with a high signal to noise ratio. It should be appreciated that other solutions to provide responses in a non-conflicting manner may be used, for example by configuring the relay nodes to use different resources.

Referring to FIG. 9, the user node UE detects in block 9-1 a fast discovery (FD) trigger event. The trigger event may a periodic trigger event, or any event causing lack of sufficiency of the link redundancy. Further, in the illustrated example, the user node UE detects in block 9-1 that a transmission (TX) gap in slot n is needed. Therefore, the user node UE informs (message 9-2), for example in a slot n-1, the relay node RN1 on the gap. Further, in the illustrated example, the user node UE continues (block 9-1) to monitor first messages.

Then the user node UE broadcast (message 9-3) in slot n the second message, or more precisely up to N second messages in slot n, one per a direction on predefined resources. In other words, depending on a network configuration (received from the network) and/or user node capabilities, one second message may be transmitted simultaneously to all selected M directions (antennas), or one second message per a selected direction (antenna) may be transmitted, resulting to M second messages being transmitted, or two or more second messages per a selected direction may be transmitted, resulting more than M second messages being transmitted.

Based on the information in message 9-2, the relay node RN1 is configured to ignore (block 9-3) the broadcasted second message in slot n. In other words, the relay node RN1 detects that the message is from the user node UE with which the relay node RN1 already has a link. However, the relay nodes RN2 and RN3 detect and decode the second message (FDRQ, Fast discovery request), as described above. However, the relay node RN2 detects (block 9-4) that the second message, FDRQ, was received with a low signal to noise ratio (SNR), for example the signal to noise ratio was below a preset or preconfigured threshold. Hence, the relay node RN2 does not send any response.

The relay node RN3 detects (block 9-5) that the second message, FDRQ, was received with a high signal to noise ratio (SNR), and therefore the relay node creates a response message (FDRE, fast discovery response), which may contain timing advance, the user node identifier for contention resolution, and resource assignment, and transmits up to N response messages (message 9-6) in slot n+m on predefined (preconfigured) resources using the best direction (best beam) over which the request was received. The N is a preconfigured value.

As described above, the user node UE monitors responses, detects responses (message 9-6) and in the illustrated example a link is established between the user node UE and the relay node RN3. Then the user device transmits (message 9-9) data in slot n+m+i using the determined best beam (direction) in the assigned resources. The same data is transmitted also to the relay node RN1 (message 9-9'). Messages 9-9 and 9-9' differ from having different payload at layer 1 and layer 2.

In the illustrated example of FIG. 9, the fast discovery procedure, resulting to a new link being established, is performed between two consecutive first messages. If a new first message would have been received before broadcasting the second messages, the fast discovery process may have been ended without any broadcast of second messages. If the new first message would have been received after broadcasting the second messages, the user node UE may be configured to ignore the new first message if a response to the second message has been received, for example.

In the above examples it has been assumed, for the sake of clarity of the description that both the user node and the relay nodes are capable to receive in all directions simultaneously. However, the transmissions may be repeated if a node is not capable to receive in all directions simultaneously.

As can be seen from the above examples, it is possible to have a network, or a sub-network in which relay nodes may be configured to broadcast discovery messages with a longer periodicity (less frequently), since a user node may trigger the fast discovery mode if the user node deems it necessary, for example for hypercritical communication. In other words, a fast local relay discovery process is performed when the user node evaluates that it may not achieve the required reliability. A less frequent broadcast of discovery messages decreases interference caused by transmissions of the discovery messages and occupies less physical resources. In a well-planned environment, the fast discovery mode will be triggered seldom, as an exception, for example due to a temporary blockage of a signal path. Hence the fast discovery mode will not contribute significantly to an overall interference level in the well-planned environment.

The blocks, related functions, and information exchanges described above by means of FIGS. 2 to 9 are in no absolute chronological order, and some of them may be performed simultaneously or in an order differing from the given one. Other functions can also be executed between them or within them, and other information may be transmitted. For example, selecting antennas (block 608 in FIG. 6), may be performed with any of the examples illustrated in FIG. 3, FIG. 4 or FIG. 5. In a further example, a transmission power may be determined, as described in block 404 in FIG. 6, in the example illustrated in FIG. 5, with or without selecting antennas. Some of the blocks or part of the blocks or one or more pieces of information can also be left out or replaced by a corresponding block or part of the block or one or more pieces of information. For example, determining whether resources from one or more lower priority sidelinks (block 808 in FIG. 8) can be taken into use, and taking them into use (block 809 in FIG. 8) may be omitted.

Figure 10:
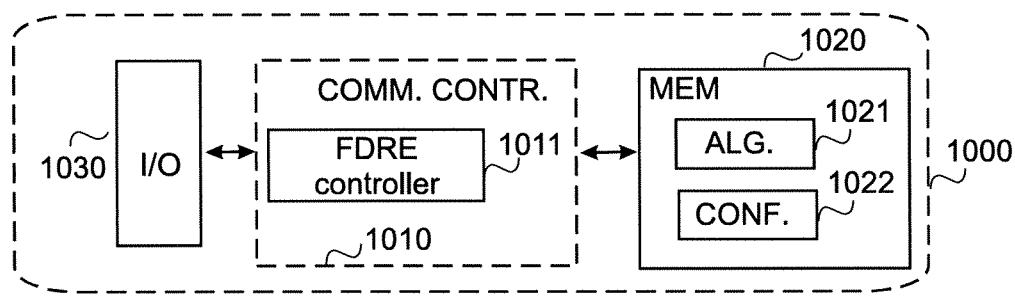
FIGS. 10 and 11 are schematic block diagrams.
Figure 11:
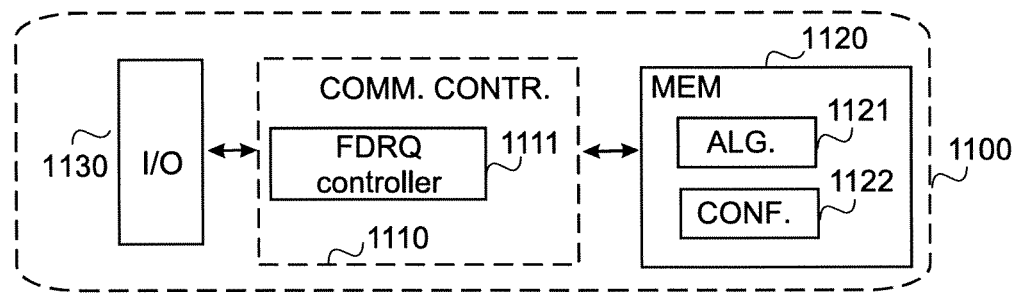

FIGS. 10 and 11 illustrate apparatuses comprising a communication controller 1010, 1110 such as at least one processor or processing circuitry, and at least one memory 1020, 1120 including a computer program code (software, algorithm) ALG. 1021, 1121, wherein the at least one memory and the computer program code (software, algorithm) are configured, with the at least one processor, to cause the respective apparatus to carry out any one of the embodiments, examples and implementations described above. FIG. 10 illustrates an apparatus configured to act at least as a relay node, i.e., a relay capable apparatus, or any corresponding apparatus, and FIG. 11 illustrates an apparatus configured to act at least as a user node, i.e. configured to use one or more sidelinks for data transmission to/from the user apparatus. The apparatuses of FIGS. 10 and 11 may be electronic devices, for example a sensor, an IIoT device, a wearable device, a home appliance device, a smart device, like smart phone or smart screen, a vehicular device, just to name couple of examples in addition to those listed with FIG. 1.

Referring to FIGS. 10 and 11, the memory 1020, 1120 may be implemented using any suitable data storage technology, such as semiconductor-based memory devices, flash memory, magnetic memory devices and systems, optical memory devices and systems, fixed memory and removable memory. The memory may comprise a configuration storage CONF. 1021, 1121, such as a configuration database, for at least storing configurations for relay discovery procedures, and link information on established links. The memory 1020, 1120 may further store a data buffer for data waiting to be processed (including transmission) and/or decoded (including reception). The memory 1020, 1120 may further store temporarily information exchanged during the discovery.

Referring to FIG. 10, the apparatus comprises a communication interface 1030 comprising hardware and/or software for realizing communication connectivity according to one or more wireless and/or wired communication protocols. The communication interface 1030 may provide the apparatus with radio communication capabilities at least for relaying data, for transmitting first messages and responses to second messages and, for monitoring second messages. The communication interface may comprise standard well-known components such as an amplifier, filter, frequency-converter, (de)modulator, and encoder/decoder circuitries, one or more antennas and conversion circuitries transforming signals between analog and digital domains. Digital signal processing regarding transmission and reception of signals may be performed in a communication controller 1010.

The communication controller 1010 comprises a fast discovery response processing circuitry 1011 (FDRE controller) configured to control monitoring second messages and responding to the second messages according to any one of the embodiments/examples/implementations described above. The communication controller 1010 may control the fast discovery response processing circuitry 1011. Depending on an implementation, one or more timers relating to second messages and responses to second messages may be controlled by the communication controller 1010 and/or by the fast discovery response processing circuitry 1011. Further, the communication controller 1010 may control other information exchange, including broadcasting first message, and/or related timers, for example timers for discovery related periodicities.

In an embodiment, at least some of the functionalities of the apparatus of FIG. 10 may be shared between two physically separate devices, forming one operational entity. Therefore, the apparatus may be seen to depict the operational entity comprising one or more physically separate devices for executing at least some of the processes described with respect to the relay node.

Referring to FIG. 11, the apparatus 1100 may further comprise a communication interface 1130 comprising hardware and/or software for realizing communication connectivity according to one or more communication protocols. The communication interface 1130 may provide the apparatus 1100 with communication capabilities with the apparatus of FIG. 10 in a multi-connectivity fashion. The communication interface may comprise standard well-known analog components such as an amplifier, filter, frequency-converter and circuitries, one or more antennas, and conversion circuitries transforming signals between analog and digital domains. Digital signal processing regarding transmission and reception of signals may be performed in a communication controller 1110.

The communication controller 1110 comprises a fast discovery request processing circuitry 1111 (FDRQ controller) configured to trigger transmission of second messages, monitoring responses to the second messages and establishing links according to any one of the embodiments/examples/implementations described above. The fast discovery request processing circuitry 1111 may further be configured to request gaps and/or monitor first messages and responding to them according to any one of the embodiments/examples/implementations described above. The communication controller 1110 may control fast discovery request processing circuitry 1111. Depending on an implementation, one or more timers may be controlled by the communication controller 1110 and/or by the fast discovery request processing circuitry 1111. Further, the communication controller 1110 may control other information exchange.

In an embodiment, at least some of the functionalities of the apparatus of FIG. 11 may be shared between two physically separate devices, forming one operational entity. Therefore, the apparatus may be seen to depict the operational entity comprising one or more physically separate devices for executing at least some of the processes described with respect to the user node.

Further, it should be appreciated that there may be apparatuses configured to act both as the relay node and the user node, and comprising, for example the fast discovery response processing circuitry 1011 and the fast discovery request processing circuitry 1111, or a fast discovery processing circuitry configured to perform at least some of the processes described with respect to the user node and the relay node.

As used in this application, the term circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 9 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples/implementations comprises a circuitry including at least one processor and at least one memory including computer program code. When activated, the circuitry causes the apparatus to perform at least some of the functionalities according to any one of the embodiments, examples, and/or implementations of FIGS. 2 to 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above but may vary within the scope of the claims. Therefore, all words and expressions should be interpreted broadly, and they are intended to illustrate, not to restrict, the exemplary embodiments.

The invention claimed is:

1. An apparatus comprising
at least one processor; and
at least one memory including computer program code, the at least one memory and computer program code configured to, with the at least one processor, cause the apparatus at least to perform:
determining sufficiency of link redundancy at least based on quality of service requirements;
monitoring, at least in response to the link redundancy being determined as sufficient, broadcasts of first messages, a first message indicating existence of a relay capable node for sidelink communications; and
causing broadcasting, in response to determining lack of sufficiency of the link redundancy, to a plurality of directions, a second message indicating a fast link discovery request for sidelink communications, and monitoring responses to said second message.

2. The apparatus according to claim 1, wherein the at least one memory and computer program code configured to, with the at least one processor, cause the apparatus further to at least to perform:
monitoring responses to the second message a predetermined period;
if no response is received during the predetermined period, repeating the causing broadcasting and the monitoring.

3. The apparatus according to claim 1, wherein the at least one memory and computer program code configured to, with the at least one processor, cause, in response to the lack of sufficiency of the link redundancy, the apparatus further to at least to perform:
establishing a link to a relay node wherefrom a response to the second message has been received, the establishing comprising:
determining beam alignment for the link based on a best reception antenna of the response and based on information in the response, the information indicating best transmission antenna to the relay node; and
using in the link establishment resources indicated in the response.

4. The apparatus according to claim 1, wherein the at least one memory and computer program code configured to, with the at least one processor, cause, in response to lack of sufficiency of the link redundancy, the apparatus further to at least to perform:
selecting, before causing broadcasting, antennas via which the second message is to be broadcasted; and
using the antennas selected in broadcasting the second message.

5. The apparatus according to claim 4, wherein the at least one memory and computer program code configured to, with the at least one processor, cause, in response to the lack of sufficiency of the link redundancy, the apparatus further to at least to perform said selecting by selecting a sub-set of the antennas based on a direction the apparatus is moving and/or based on a number of slots one or more relay capable nodes are monitoring second messages.

6. The apparatus according to claim 1, wherein the at least one memory and computer program code configured to, with the at least one processor, cause, in response to the lack of sufficiency of the link redundancy, the apparatus further to at least to perform:
determining, before causing broadcasting, a transmission power for the broadcasting of the second message.

7. The apparatus according to claim 1, wherein the at least one memory and computer program code configured to, with the at least one processor, cause, in response to the lack of sufficiency of the link redundancy, the apparatus further to at least to perform:
determining, before causing broadcasting, whether any transmission gaps are needed to broadcast the second message; and
informing, in response to one or more transmission gaps being needed, before causing broadcasting, corresponding one or more relay nodes on the need for one or more transmission gaps.

8. An apparatus comprising
at least one processor; and
at least one memory including computer program code, the at least one memory and computer program code configured to, with the at least one processor, cause the apparatus at least to perform:
broadcasting periodically first messages, a first message indicating that the apparatus is a relay capable node for sidelink communications;
monitoring responses to the first messages;
monitoring broadcasted second messages over a plurality of directions, wherein a second message indicates a fast link discovery request for sidelink communications with quality of service requirements;
determining, upon detecting a second message, whether there are resources available for relaying the sidelink communications with the quality of service requirements; and
causing sending, in response to resources being determined as available, a response to the second message using a direction determined to be the best in the detecting of the second message.

9. The apparatus according to claim 8, wherein the at least one memory and computer program code configured to, with the at least one processor, cause, the apparatus to perform during the determining at least:
determining, in response there is not enough resources available, whether there are one or more sidelinks that have a lower priority than the one indicated by the quality of service requirements in the second message and that have resources, if taken into use, combined with available resources, will result to enough resources to meet the quality of service requirements; and
taking, if the quality of service requirements are met, before sending the response, the resources allocated to said one or more sidelinks that have the lower priority, into use for the sidelink communications requested in the second message.

10. The apparatus according to claim 8, wherein the at least one memory and computer program code configured to, with the at least one processor, cause the apparatus, when the second message comprises a sequence and an encoded message, further to at least to perform:
detecting the sequence;
determining a beam direction over which a symbol with the strongest value in the sequence was received to be the best direction;
decoding, in response to detecting the sequence, the encoded message; and
adding, in response to resources being available, as information indicating the best transmission antenna to the apparatus, information on the symbol to the response before causing sending the response.

11. The apparatus according to claim 8, wherein the at least one memory and computer program code configured to, with the at least one processor, cause, in response to lack of sufficiency of the link redundancy, the apparatus further to at least to perform:
determining, in response to resources being available, before causing sending the response, a transmission power for the response based at least on the transmission power used for the second message and/or reception power of the second message and/or reception quality of the second message.

12. The apparatus according to claim 8, wherein the at least one memory and computer program code configured to, with the at least one processor, cause the apparatus to perform said monitoring as a quasi-omnidirectional reception.

13. A method comprising:
determining, by an apparatus, sufficiency of link redundancy at least based on quality of service requirements;
monitoring, by the apparatus, at least in response to the link redundancy being determined as sufficient, broadcasts of first messages, a first message indicating existence of a relay capable node for sidelink communications; and
causing broadcasting, from the apparatus, in response to determining lack of sufficiency of the link redundancy, to a plurality of directions, a second message indicating a fast link discovery request for sidelink communications, and monitoring, by the apparatus, responses to said second message.

14. A method comprising:
broadcasting, by an apparatus, periodically first messages, a first message indicating that the apparatus is a relay capable node for sidelink communications;
monitoring responses to the first messages;
monitoring, by the apparatus, broadcasted second messages over a plurality of directions, wherein a second message indicates a fast link discovery request for sidelink communications with quality of service requirements;
determining, by the apparatus, in response to detecting a second message, whether there are resources available for relaying the sidelink communications with the quality of service requirements; and
causing sending from the apparatus, in response to resources being available, a response to the second message using a direction determined to be the best in the detecting of the second message.

15. A non-transitory computer-readable medium comprising program instructions, which, when executed by an apparatus, cause the apparatus to carry out at least one of a first process or a second process,
wherein the first process comprises at least:
determining sufficiency of link redundancy at least based on quality of service requirements;
monitoring, at least in response to the link redundancy being determined as sufficient, broadcasts of first messages, a first message indicating existence of a relay capable node for sidelink communications; and causing broadcasting, in response to determining lack of sufficiency of the link redundancy, to a plurality of directions, a second message indicating a fast link discovery request for sidelink communications, and monitoring responses to said second message;

wherein the second process comprises at least:

broadcasting periodically first messages;

monitoring responses to the first messages;

monitoring broadcasted second messages over a plurality of directions;

determining, upon detecting a second message, whether there are resources available for relaying the sidelink communications with the quality of service requirements; and causing sending, in response to resources being determined as available, a response to the second message using a direction determined to be the best in the detecting of the second message.

16. A computer readable medium of claim 15, wherein the computer readable medium is a non-transitory computer readable medium.

17. A non-transitory computer readable medium comprising program instructions which, when executed by an apparatus, cause the apparatus to carry out:

determining sufficiency of link redundancy at least based on quality of service requirements;

monitoring, at least in response to the link redundancy being determined as sufficient, broadcasts of first messages, a first message indicating existence of a relay capable node for sidelink communications; and causing broadcasting, in response to determining lack of sufficiency of the link redundancy, to a plurality of directions, a second message indicating a fast link discovery request for sidelink communications, and monitoring responses to said second message.

18. The apparatus according to claim 2, wherein the at least one memory and computer program code configured to, with the at least one processor, cause the apparatus to perform said monitoring as a quasi-omnidirectional reception.

* * * * *